United States Patent
Tsujii (10) Patent No.: US 6,608,915 B2
(45) Date of Patent: *Aug. 19, 2003

(54) IMAGE PROCESSING METHOD AND APPARATUS

(75) Inventor: Osamu Tsujii, Utsunomiya (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,132

(22) Filed: Dec. 21, 1998

(65) Prior Publication Data

US 2003/0072480 A1 Apr. 17, 2003

(30) Foreign Application Priority Data

Dec. 25, 1997 (JP) .............................. 9-358300

(51) Int. Cl.⁷ ................................ G06K 9/00
(52) U.S. Cl. ..................... 382/132; 378/98.7
(58) Field of Search ............... 382/132, 138, 382/254; 378/62, 98.7; 348/222.1; 600/439, 409

(56) References Cited

U.S. PATENT DOCUMENTS

| | | | | |
|---|---|---|---|---|
| 5,228,443 A | * | 7/1993 | Tatar .......................... | 600/439 |
| 5,368,033 A | * | 11/1994 | Moshfeghi .................. | 128/653 |
| 5,471,987 A | * | 12/1995 | Nakazawa et al. ......... | 600/409 |
| 5,835,618 A | * | 11/1998 | Fang et al. ................. | 382/132 |
| 5,909,244 A | * | 6/1999 | Waxman et al. ............ | 348/222 |
| 5,991,457 A | * | 11/1999 | Ito et al. ..................... | 382/254 |
| 6,055,327 A | * | 4/2000 | Aragon ....................... | 382/138 |
| 6,151,404 A | * | 11/2000 | Pieper ........................ | 382/128 |

OTHER PUBLICATIONS

Jain, Anil K., "Fundamentals of Digital Image Processing", Prentice Hall Information and System Sciences Series, pp. 381–390.

Tsujii, Osamu, et al., "Automated Segmentation of Anatomic Regions in Chest Radiographs using an Adaptive-Sized Hybrid Neural Network", SPIE, vol. 3034, pp. 802–811.

Tsujii, Osamu, et al., "Anatomic Region Based Dynamic Range Compression for Chest Radiographs Using Warping Transformation of Correlated Distribution", SPIE, vol. 3034, pp. 812–821.

* cited by examiner

Primary Examiner—Jayanti K. Patel
Assistant Examiner—Barry Choobin
(74) Attorney, Agent, or Firm—Fitzpatrick, Cella, Harper & Scinto (57) ABSTRACT

The present invention provides an image processing apparatus that constantly and efficiently obtains stable high-grade images. Sorting means sorts a target image into a first site and a second site. Extraction means and statistical-amount acquisition means extract the characteristic amounts of at least two pixels contained in at least either the first or second site and determine the statistical amount of the characteristic amounts for at least either the first or second site. Transformation means transforms pixel values based on the statistical amount. Dynamic-range compression processing is executed depending on the characteristic of the target image and in a manner optimal to the features of this image.

15 Claims, 6 Drawing Sheets

P1(●): PIXEL POSITION BEFORE WARPING TRANSFORMATION
P2(○): PIXEL POSITION AFTER WARPING TRANSFORMATION

IMAGE PROCESSING METHOD AND APPARATUS

BACKGROUND OF THE INVENTION

1. Field of the Invention

The present invention relates to an image processing method and apparatus having a dynamic-range compression processing function for an image such as an X-ray chest image, using anatomical information.

2. Related Background Art

For example, an X-ray chest image is composed of an image of a lung field that X rays are easy to penetrate and an image of a mediastinum portion that X rays are very difficult to penetrate, so the range is very large in which pixel values are present.

Thus, it has been difficult to obtain an X-ray chest image that enables both the lung field and the mediastinum portion to be observed.

Consequently, for a practitioner to diagnose the chest, individual X-ray images (films) must be photographed and prepared for the diagnosis of the lung field and mediastinum respectively.

A method for avoiding this problem is a "self-compensation digital filter" (developed by Dr. Anan of National Cancer Center).

Figure 1A:
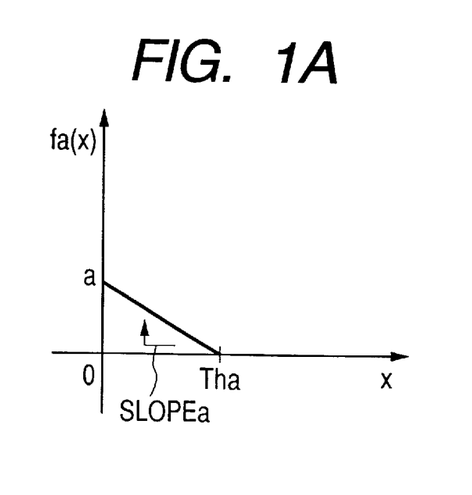
FIGS. 1A and 1B are drawings for describing general dynamic-range compression.
Figure 1B:
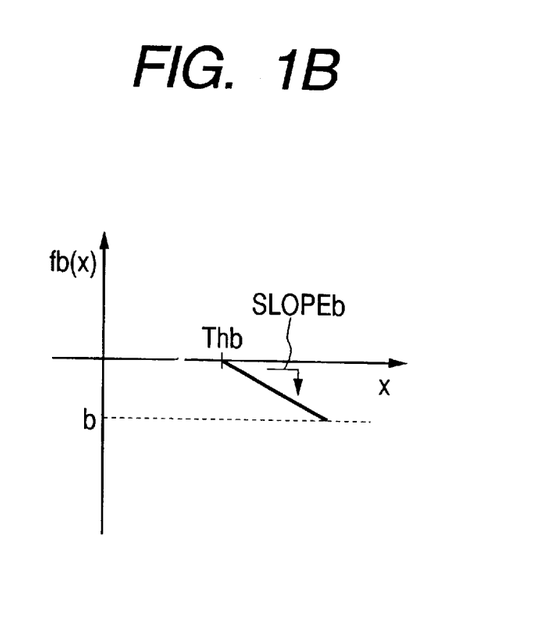

The self-compensation digital filter is expressed by the following expressions:

$$S_D = S_{org} + f(S_{US}) \quad (1)$$

$$S_{US} = \Sigma S_{org}/M^2 \quad (2)$$

where $S_D$ is a pixel value obtained after compensation (processing), $S_{org}$ is an original pixel value (an input pixel value), $S_{US}$ is an average pixel value obtained when taking the movement average of an original image (an input image) using a mask size of M×M pixels, and f(x) is a function having characteristics shown in FIGS. 1A and 1B.

The characteristics of the function f(x) are explained now. In the characteristic shown in FIG. 1A, f(x) is "0" when x>$Th_a$ where x is a signal value and where $Th_a$ is a threshold, and f(x) monotonously decreases with an intercept "$Th_a$" and a slope "$SLOPE_a$" when $0 \leq x \leq Th_a$ (the function f(x) having this characteristic is hereafter referred to as "$f_a(x)$").

Thus, when the equation (1) is executed using the original pixel value $S_{org}$ as a density equivalent, the density of the image is increased where its average is low.

In the characteristic shown in FIG. 1B, f(x) is "0" when $0 < x \leq BASE_b$ where x is a signal value and where $Th_b$ is a threshold, and f(x) monotonously decreases into the negative area with an intercept "$Th_b$" and a slope "$SLOPE_b$" when $x \geq Th_b$ (the function f(x) having this characteristic is hereafter referred to as "$f_b(x)$").

Thus, when the equation (1) is executed using the original pixel value $S_{org}$ as a density equivalent, the density of the image is reduced where its average is high.

When this "self-compensation digital filter" method is used for an image of the mediastinum that X rays are very difficult to penetrate, the density of the mediastinum portion of the X-ray chest image is increased due to the characteristic shown in FIG. 1A to provide an X-ray chest image that enables both the lung field and the mediastinum to be observed.

In addition to this self-compensation digital filter, a method is available that uses the results of anatomical segmentation to compress the dynamic range based on the difference in the characteristic amount of the anatomical site.

That is, as described in detail in "SPIE Medical Imaging 97 'Anatomic Region Based Dynamic Range Compression for Chest Radiographs Using Warping Transformation of Correlated Distribution'", this method (hereafter referred to as the "dynamic-range-compression-based method") subjects an X-ray chest image to predetermined image processing to define the mediastinum portion based on the results of the identification and extraction (hereafter referred to as "segmentation") of the lung field portion, automatically determines an affine transformation function that transforms the pixel values of the lung field portion and/or mediastinum portion in order to analyze the distributions of the pixel values of the two image regions including the lung field portion and mediastinum portion and of the peripheral average value.

An X-ray chest image that enables both the lung field and mediastinum portion to be observed can also be obtained using this dynamic-range-compression-based method for an image of the mediastinum portion that X rays are very difficult to penetrate because it increases the density of this portion of the X-ray chest portion.

The conventional "self-compensation digital filter", however, has no logical algorithm for automatically determining parameters such as slopes $SLOPE_a$ and $SLOPE_b$. Thus, the desired results of a target image can be obtained depending on the settings of the parameters, but these results are not always obtained stably.

In addition, the conventional dynamic-range-compression-based method is for automating the compression of the lung field portion, and no method has been specified for compressing the mediastinum portion. In addition, the control of the amount of compression during dynamic-range compression is not specified. Thus, this method cannot control the contrast, thereby failing to provide quality X-ray images stably.

SUMMARY OF THE INVENTION

The present invention is provided to eliminate the above disadvantages, and its object is to provide an image processing method that can provide high-grade images stably.

Another object of the present invention is to provide an image processing apparatus, an image acquisition apparatus, and an image processing system that can provide high-grade images stably.

To achieve these objects, according to one aspect of the present invention, there is provided an image processing method including a step of dynamic-range-compression processing of an image, wherein the dynamic-range compression processing step comprises a sorting step of sorting the image into a first and a second sites, an extraction step of extracting the characteristic amounts of at least two pixels contained in at least either the first or second site, a statistical-amount acquisition step of determining the statistical amount of the characteristic amounts for at least either the first or second site, and a transformation step of transforming pixel values based on the statistical amount.

According to another aspect of the present invention, there is provided an image processing method including a step of dynamic-range-compression processing of an image, wherein the dynamic-range compression processing step comprises a sorting step of sorting the image into first and second sites, a boundary acquisition step of determining the boundary site between the first and second sites, an extraction step of extracting the characteristic amounts of at least two pixels contained in at least one of the first and second sites and the boundary site, a statistical-amount acquisition step of determining the statistical amount of characteristic amounts for at least one of the first and second sites and the boundary site, and a transformation step of transforming pixel values based on the statistical amount.

Furthermore, according to a preferred embodiment, the image is an X-ray image, and the sorting step includes a step of sorting as the first site a site in the X-ray image that X-rays are easy to penetrate while sorting as the second site a site in the X-ray image that X-rays are difficult to penetrate.

Further, according to another aspect of the present invention, there is provided an image processing apparatus for dynamic-range-compression processing of an image, comprising sorting means for sorting the image into first and second sites, extraction means for extracting the characteristic amounts of at least two pixels contained in at least either the first or second site, statistical-amount acquisition means for determining the statistical amount of the characteristic amounts for at least either the first or second site, and transformation means for transforming pixel values based on the statistical amount.

The other objects and features of this invention will be clear from the following detailed description of the embodiments referencing the drawings.

DETAILED DESCRIPTION OF THE PREFERRED EMBODIMENTS

The embodiments of the present invention are described below with reference to the drawings.

An image processing method according to the present invention is applicable to, for example, an image processing method for an X-ray chest image including an image of the lung field that X rays are easy to penetrate (the lung field portion; a first site) and an image of the mediastinum that X rays are very difficult to penetrate (the mediastinum portion; a second site).

This image processing method uses anatomical information as base for its algorithm. Thus, anatomical information for X-ray chest images is described.

For X-ray chest images, it is important to extract a region of the lung field portion. There are various methods for extracting the lung field portion, and one of such methods is described in "SPIE Medical Imaging 97 'Automatic Segmentation of Anatomic Regions in Chest Radiographs using an Adaptive-Sized Hybrid Neural Network'".

This method carries out segmentation by using a neural network to learn as characteristic amounts, density information for each pixel, anatomical address information, and entropy information for the periphery of the pixel.

Specifically, it is determined whether each pixel is included in the lung field or another portion, using density information for each pixel, anatomical address information, and entropy information for the periphery of the pixel. As a determination means, the neural network is used to apply the results of the learning of a number of images to other images.

In this method, the anatomical address information that is allocated to each pixel is most important and mostly determines the performance of this method. The anatomical address information uses the profiles of the image in the horizontal and vertical directions to obtain their first-order differentiation while retrieving a peak in order to detect the intersections of the right and left lungs and clavicle and the diaphragm line of the right lung. The anatomical address information is allocated to each pixel based on these extracted points.

Figure 2A:
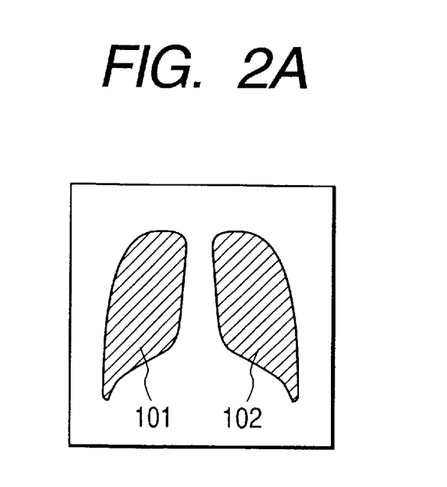
FIGS. 2A and 2B are drawings for describing the results of the segmentation of an image of the lung field and the determination of an image of the mediastinum based on the results according to an image processing method according to this invention.

As a result, lung field portions 101 and 102, which are shown in FIG. 2A, are extracted.

Figure 2B:
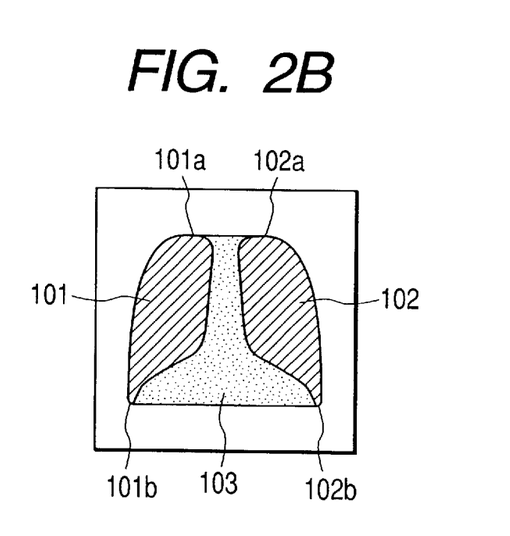

Then, based on the results (FIG. 2A) of the extraction of the lung field portions 101 and 102, an image of the mediastinum is defined as a closed space 103 formed by connecting together the upper end 101a of the left lung field portion 101 and the upper end 102a of the right lung field portion 102 and connecting together the lower end 101b of the left lung field portion 101 and the lower end 102b of the right lung field portion 102, as shown in FIG. 2B.

These results of anatomical segmentation are used to execute dynamic-range compression processing, and this invention uses the compression method described in, for example, "SPIE Medical Imaging 97 'Anatomic Region Based Dynamic Range Compression for Chest Radiographs Using Warping Transformation of Correlated Distribution'".

Those portions of an X-ray chest image which require dynamic-range compression include those having a very low density such as the mediastinum portion, the portion under the diaphragm portion, and the heart portion or those having a very high density such as the center of the lung field. Accordingly, the present invention compresses, for example, the mediastinum portion, the portion under the diaphragm, and the heart portion.

Thus, the defined mediastinum is defined in a broad sense and includes the mediastinum portion, the portion under the diaphragm, and the heart portion in a narrow sense.

In addition to the mediastinum portion, the diaphragm portion, those portions of the heart portion which have a very low density, the center of the lung field having a very high density, and even the lung field can be subjected to the dynamic-range compression processing described below.

Then, parameters are determined that are used for dynamic-range-compression of the mediastinum portion (in a broad sense). Three parameters are determined: a point passed by a warping line, the angle (inclination) of the warping line, and a warping angle.

The warping line and angle are described in detail in, for example, the cited document "SPIE Medical Imaging 97

'Anatomic Region Based Dynamic Range Compression for Chest Radiographs Using Warping Transformation of Correlated Distribution'". In addition, this invention does not directly relate to the processing using the above three parameters but to the method for determining such parameters.

Thus, the embodiments described below are examples of the application of the present invention to the dynamic-range compression processing using the above three parameters.

The method for determining each parameter according to the present image processing method is specifically described.

First, the following two methods are each described as a method for determining a point passed by a warping line.

Method 1

A point $(x_2, y_2)$ passed by a warping line is defined as the centroid (average) of a correlation distribution formed of the points belonging to the mediastinum portion. That is, this point is defined as the average of the pixel values of the points belonging to the mediastinum and its peripheral pixel values.

According to this method, half the pixels contained in the mediastinum portion are more or less subjected to dynamic-range compression.

Thus, in this method, if an original pixel value is denoted as $S(i, j)$, a peripheral pixel value $S_{US}(i, j)$ obtained using a K×K pixel mask is expressed by the following equation.

$$S_{us}(i, j) = \frac{1}{K^2} \sum_p \sum_q S(i+p, j+q): \ -K/2 \leq p \leq K/2,$$

$$-K/2 \leq q \leq K/2$$

If a set of pixels contained in the mediastinum portion is denoted as "Rm$^2$" and the number of elements in the set is denoted as "Nm", the point $(x_2, y_2)$ passed by the warping line is determined by the following equations.

$$x_2 = \frac{1}{N_m} \sum_{i,j} S(i, j): \ (i, j) \in R_m^2$$

$$y_2 = \frac{1}{N_m} \sum_{i,j} S_{us}(i, j): \ (i, j) \in R_m^2$$

Method 2

The point $(x_2, y_2)$ passed by the warping line is defined as the average of the boundary region between the lung portion and the mediastinum portion.

According to this method, all the pixels contained in the mediastinum portion are more or less subjected to dynamic-range compression.

This method, extracts the boundary between the lung portion and the mediastinum portion using the shape processing, that is, morphology processing and logical calculations described in detail in "Fundamentals of Digital Image Processing (pp. 384 and its periphery) Anil K. Jain".

Figure 3:
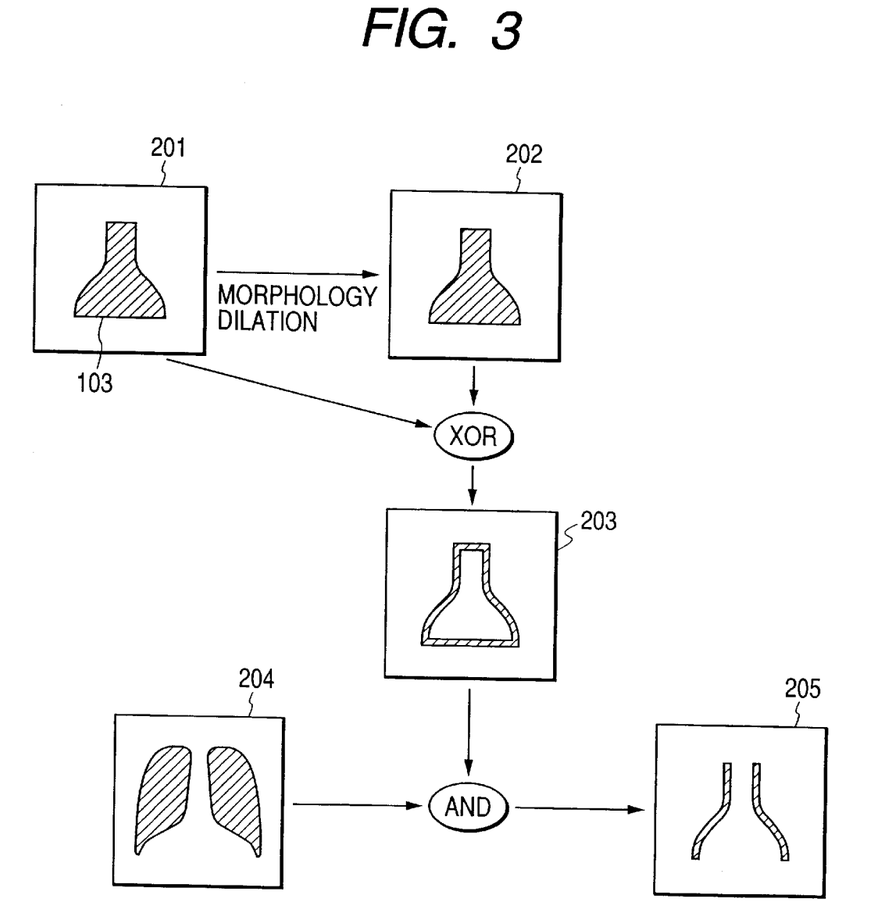
FIG. 3 is a drawing for describing the determination of the boundary between the lung field and the mediastinum.

Specifically, expansion processing based on the morphology processing, that is, dilation is applied to an image 201 in which the mediastinum 103 (FIG. 2B) obtained in the above manner is defined as "1" (the shaded portion) while the other portion is defined as "0" (the white portion) as shown in FIG. 3. That is, the image 201 is dilated to obtain an image 202 with the mediastinum portion 103 dilated.

The window size used for such dilation, that is, the amount of dilation determines the width of the boundary, and if the size of the image is 256×256 pixels, the window size may be about "10". In this case, the width of the boundary is 10 pixels.

Subsequently, the exclusive—or (XOR) of the images 201 and 202 is calculated to obtain an image 203 of the outer contour of the mediastinum. The logical product (AND) of the image 203 and an image 204 of the lung field (FIG. 2A) is calculated to extract an image 205 of the boundary between the lung field and the mediastinum.

Thus, according to this method, if the set of pixels contained in the boundary in the image 205 is denoted as "$R_b^2$" and the number of the elements in the set is denoted as "$N_b$", the point $(x_2, y_2)$ passed by the warping line is determined by the following equations.

$$x_2 = \frac{1}{N_b} \sum_{x,y} S(x, y): \ (x, y) \in R_b^2$$

$$y_2 = \frac{1}{N_b} \sum_{x,y} S_{us}(x, y): \ (x, y) \in R_b^2$$

Methods 1 and 2 using the centroid (average) of the correlation distribution formed of the points belonging to the mediastinum and the average of the boundary region between the lung portion and the mediastinum portion, respectively, have been described as examples of methods for determining the point $(x_2, y_2)$ passed by the warping line.

Next, exactly speaking, the warping angle is associated with the slope of the warping line. That is, the slope of the warping line can be varied to vary the contrast of the image signal during dynamic-range compression in order to vary the compression range despite the same warping angle.

If the slope of the warping line is "0", the compression range based on the slope of the warping line is determined by the degree at which the minimum density of the mediastinum is increased based on the density conversion.

In general, if an X-ray chest image is printed out on a silver salt film and if the maximum densities of the lung field, the boundary region between the lung field and the mediastinum (hereafter referred to as the "lung-mediastinum boundary"), and the mediastinum are assumed to be 1.8D, about 1.0D, and about 0.2D, the difference in density between the lung-mediastinum boundary and the mediastinum is 0.8D.

Figure 4:
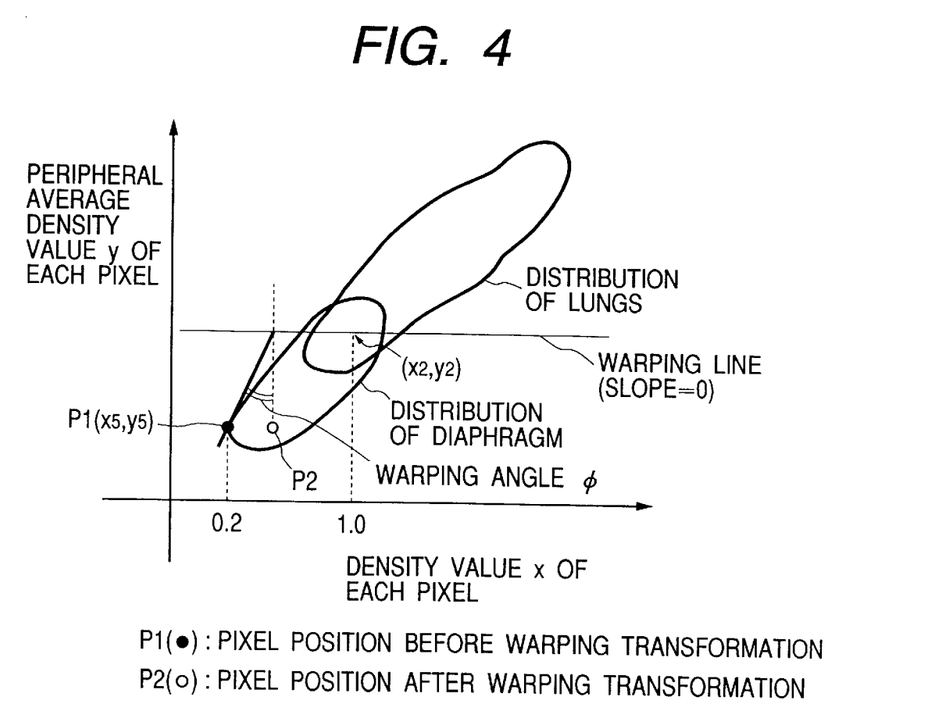
FIG. 4 is a drawing for describing the determination of a warping angle when the slope of a warping line is "0"

In this case, when, for example, on the correlation distribution of the mediastinum, the pixel of the minimum density is located at $P1(x_5, y_5)$ and the density is increased by $\Delta d$, as shown in FIG. 4, the warping angle $\phi$ is determined by the following equation.

$$\phi = \tan^{-1} \frac{\Delta d}{y_2 - y_5}$$

On the other hand, the range of dynamic-range compression can be specified by the difference in the densities of the lung-mediastinum boundary and the mediastinum in percentage instead of density $\Delta d$. In this case, if the compression rate range is denoted as $\Delta p$ percent, the warping angle $\phi$ is determined by the following equation.

$$\phi = \tan^{-1} \frac{\Delta p / 100 \times (x_2 - x_5)}{y_2 - y_5}$$

The extraction of P1($x_5$, $y_5$) is described. For a set of pixels $R_m^2$ contained in the mediastinum, the maximum density value $x_5$ of the pixels is expressed by the following equation.

$$x_5 = m_a \times \{x|(x,y) \in R_m^2\}$$

When the number of those pixels in set $R_m^2$ whose pixel value (x) is $x_5$ is "$N_{b5}$", the peripheral average density value $y_5$ of pixels having a pixel value (x)=$x_5$ is expressed by the following equation.

$$y_2 = \frac{1}{N_{b5}} \sum y : (x_5, y) \in R_m^2$$

The characteristics of dynamic-range compression and the determination of the warping angle in the case in which the slope of the warping line is varied are described below.

The slope of the warping line is determined by individual processed images.

Figure 5:
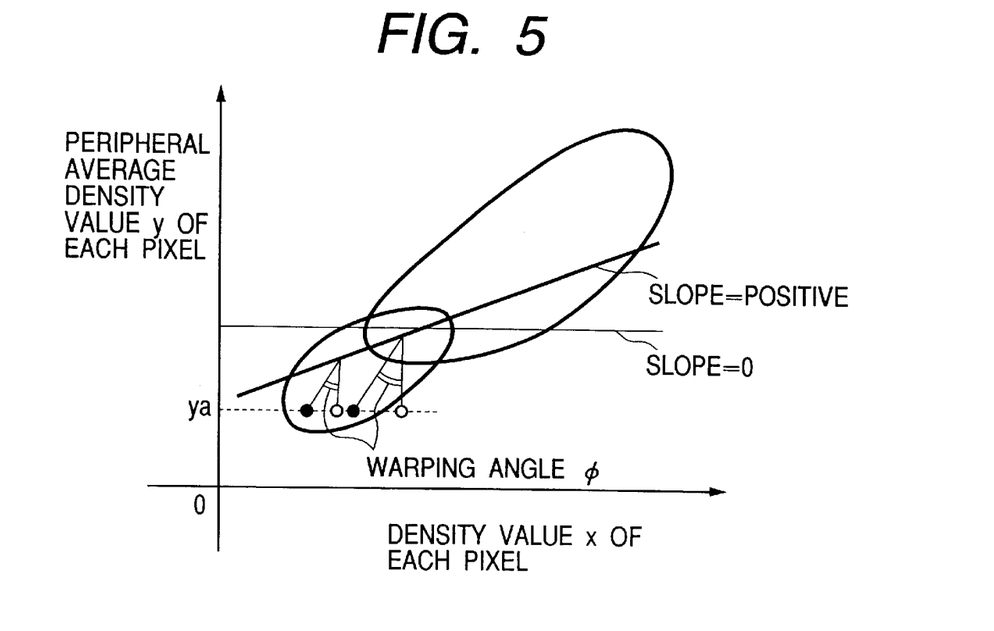
FIG. 5 is a drawing for describing the warping state occurring when the slope of the warping line has a "positive" value.

If, for example, the slope of the warping line is set positive, pixels having the same peripheral average density value $y_a$ (mutually closely located pixels) have their density increased by a larger amount as their original density is higher, as shown in FIG. 5, That is, the group of pixels having the same peripheral average density value $y_a$ (mutually closely located pixels) has their contrast increased.

Figure 6:
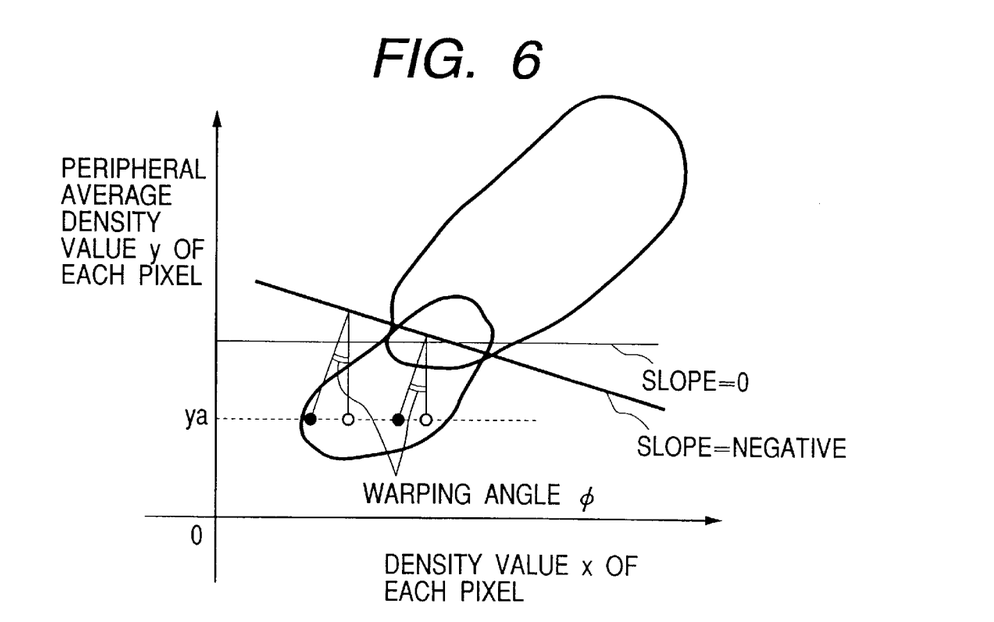
FIG. 6 is a drawing for describing the warping state occurring when the slope of the warping line has a "negative" value.

On the other hand, if the slope of the warping line is set negative, pixels having the same peripheral average density value $y_a$ have their density increased by a larger amount as their original density is lower, as shown in FIG. 6. That is, the group of pixels having the same peripheral average density value $y_a$ have their contrast reduced.

This nature serves to achieve the object to maintain the view of the information on the mediastinum constant.

The standard deviation of the image density value at the centroid portion of the mediastinum portion and the average of the peripheral average density are used as characteristic amount for determining the slope of the warping line.

When the set of pixels contained in the mediastinum is denoted as $R_m^2$ and the number of elements in the set is denoted as $N_m$, the average of the peripheral average density "$\mu_m$" is defined by the following equation.

$$\mu_m = \frac{1}{N_m} \sum_{i,j} S_{us}(i, j) : (i, j) \in R_m^2$$

In addition, when the standard deviation is denoted as "$\sigma_m$", it is defined by the following equation.

$$\sigma_m = \left( \sum_{i,j} (S(i, j) - \mu_m)^2 \right)^{1/2} : S_{us}(i, j) = \mu_m \ (i, j) \in R_{m^2}$$

The characteristic amount of standard deviation $\sigma_m$ represents the dispersion of signals from the mediastinum in the target image. Thus, the image originally has a high contrast if "$\sigma_m/\mu_m$" is large whereas it originally has a low contrast if "$\sigma_m/\mu_m$" is small.

When thresholds $Th_l$ and $Th_u$ and coefficients $K_1$ and $K_2$ are used, the slope of the warping line is determined by the following equation.

$$slope = \begin{cases} K_1(Th_u - \sigma_m/\mu_m): & Th_u < \sigma_m/\mu_m \\ 0: & Th_l \leq \sigma_m/\mu_m \leq Th_u \\ K_2(Th_l - \sigma_m/\mu_m): & Th_l > \sigma_m/\mu_m \end{cases}$$

The slope of the warping line may be adaptively determined based on the characteristics of the apparatus or the user's desires.

The slope of the warping line is determined in the above manner. The warping angle is determined as described below.

Figure 7:
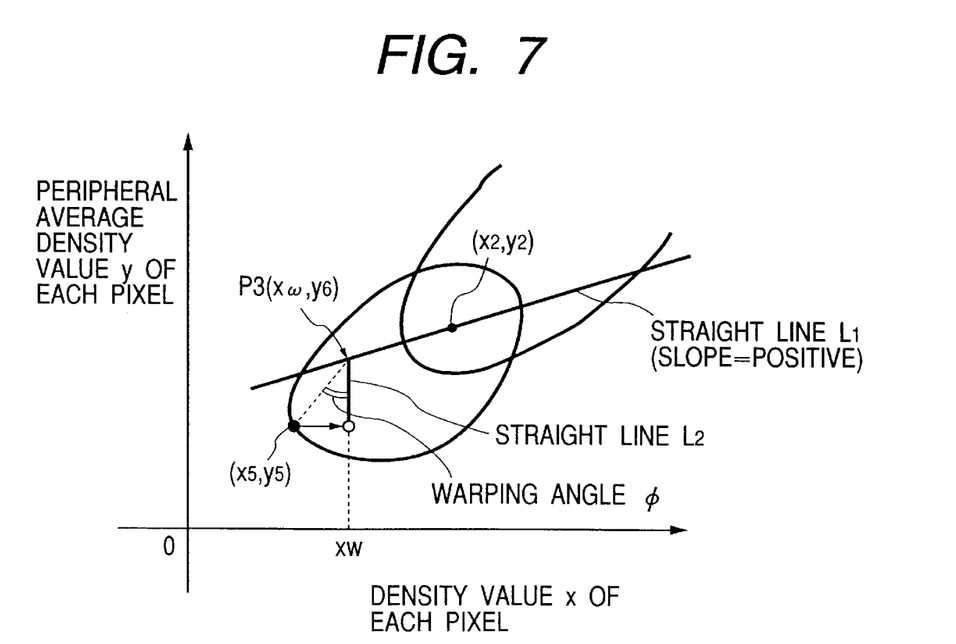
FIG. 7 is a drawing for describing the determination of a warping angle when the slope of the warping line is varied.

When, for example, the compression rate range is denoted as $\Delta p$ percent, and the position of the pixel value after warping is denoted as P3 ($x_w$, $y_6$), as shown in FIG. 7, the straight line $L_1$ of the slope (positive) passing ($x_2$, $y_2$) is expressed by:

$$y - y_2 = \text{slope} \ (x - x_2)$$

the y coordinate value $y_6$ of P3 ($x_w$, $y_6$) that is the intersection of straight line $L_1$ and straight line $L_2$ of x=$x_w$ is expressed by:

$$y_6 = \text{slope} \ (x_w - x_2) + y_2$$

Accordingly, warping angle $\phi$ is determined by the following equation.

$$\phi = \tan^{-1} \frac{\Delta p / 100 \times (x_2 - x_5)}{y_2 + slope(x_w - x_2) - y_5}$$

If the slope is "negative", warping angle $\phi$ can be determined as in the "positive" slope.

Figure 8:
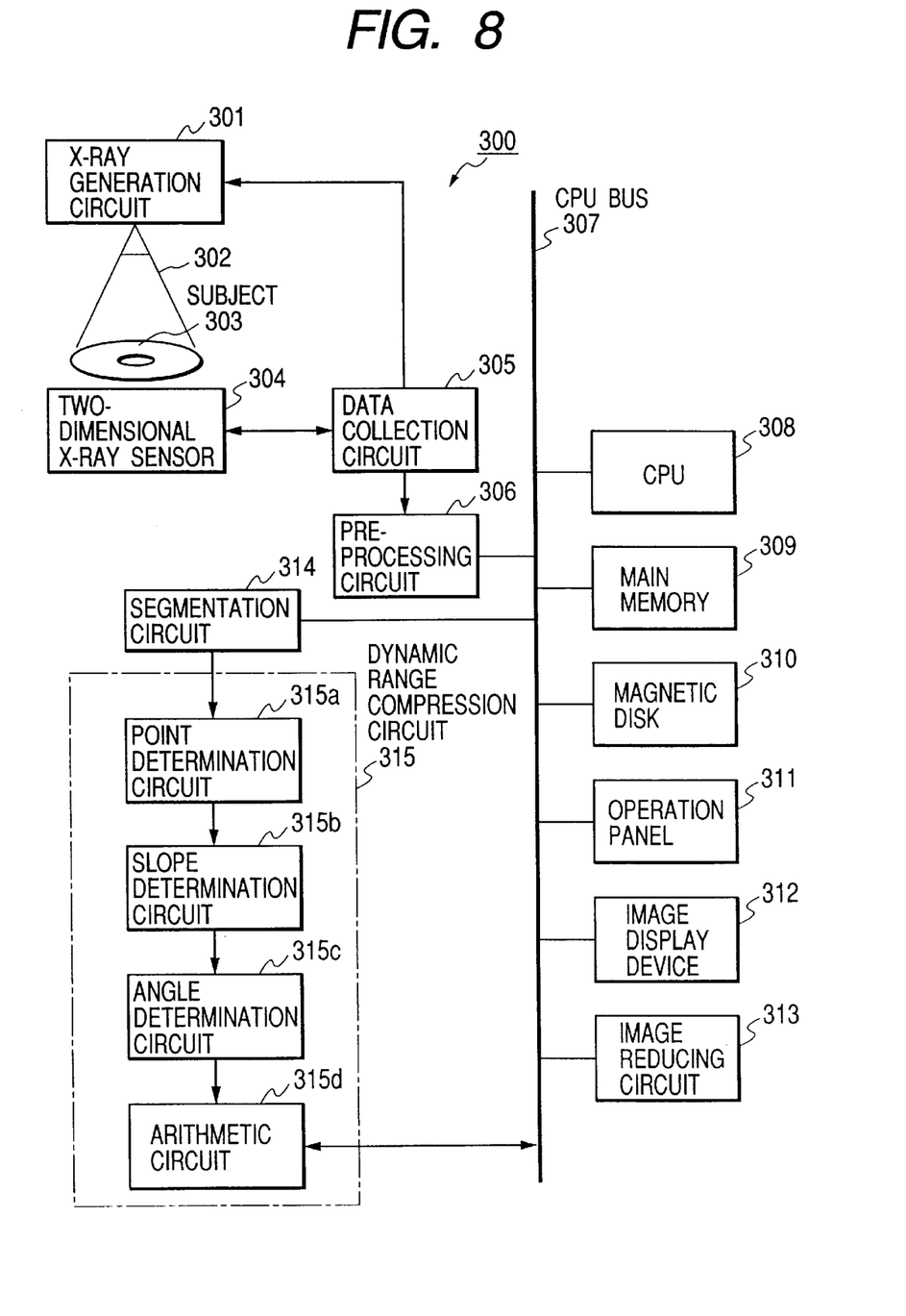
FIG. 8 is a block diagram showing a configuration of an image processing apparatus that executes the image processing method.

The above image processing method is carried out by an image processing apparatus 300, which is shown in FIG. 8.

An image processing apparatus according to the present invention has been applied to this image processing apparatus 300.

The image processing apparatus 300 is used for X-ray images and has a dynamic-range compression function. It comprises a pre-processing circuit 306, a segmentation circuit 314, a dynamic range compression circuit 315, a CPU 308, a main memory 309, a magnetic disc driver 310, an operation panel 311, an image display device 312, and an image reducing circuit 313, as shown in FIG. 8. These circuits mutually transmit data via a CPU bus 307.

The image processing apparatus 300 also includes a data acquisition circuit 305 connected to the pre-processing circuit 306, a two-dimensional X-ray sensor 304 connected to the data acquisition circuit 305, and an X-ray generation circuit 301.

Furthermore, the dynamic-range compression circuit 315 includes a point determination circuit 315a connected to the segmentation circuit 314, a slope determination circuit 315b connected to the point determination circuit 315a, an angle determination circuit 315c connected to the slope determination circuit 315b, and an arithmetic circuit 315d connected to the angle determination circuit 315c. The arithmetic circuit 315d is also connected to the CPU bus 307.

In this image processing circuit 300, various data required for processing in the CPU 308 is stored in the main memory 309. The main memory 309 is also used as a work memory for tasks executed by the CPU 308.

The CPU 308 uses the main memory 309 to control the operation of the entire apparatus according to operations from the operation panel 311.

Thus, the image processing apparatus 300 operates in the following manner.

First, the X-ray generation circuit 301 emits an X-ray beam 302 to a subject 302.

The X-ray beam 302 emitted from the X-ray generation circuit 301 penetrates the subject 303 while being attenuated, and reaches the two-dimensional X-ray sensor 304, which then outputs an X-ray image.

In this case, the X-ray image output from the two-dimensional X-ray sensor 304 is a chest image including the lung field and the mediastinum as described above.

The data acquisition circuit (DAS) 305 converts the X-ray image output from the two-dimensional X-ray sensor 304, into an electric signal and then supplies it to the pre-processing circuit 305.

The pre-processing circuit (PREP) 305 applies pre-processing such as offset or gain correction processing to signals (X-ray image signals) from the data acquisition circuit 305.

The X-ray image signal, which has been pre-processed by the pre-processing circuit 305, is transferred to each of the magnetic disc driver 310 and the image reducing circuit 313 via the CPU bus 307 under the control of the CPU 308.

The magnetic disc driver 310 stores the X-ray image signal transferred via the CPU bus 307, in a magnetic disc (not shown) as a raw image information file.

At the same time, the image reducing circuit (RDU) 313 reduces the size of the X-ray image signal transferred via the CPU bus 307 using a reduction rate and method indicated by the CPU 308.

The reduction rate used by the image reducing circuit 313 reduces each side of the image down to $\frac{1}{8}$ to $\frac{1}{16}$, and is set using the operation panel 311.

In addition, the reduction method used by the image reducing circuit 313 is either an averaging reduction method or a sampling (decimation) method, which is set using the operation panel 311. In this embodiment, the operation panel 311 sets, for example, the use of an averaging reduction method with little noise.

According to the settings of the operation panel 311, the CPU 308 uses the averaging reduction method to control the image reduction circuit 313 in such a way as to reduce each side of the image down to $\frac{1}{8}$ to $\frac{1}{16}$.

The X-ray image signal (reduced image signal), the size of which has been reduced by the image reducing circuit 313, is supplied to the segmentation circuit 314 via the CPU bus 307.

The segmentation circuit 314 applies various segmentations to the reduced image signal transferred via the CPU bus 307 to extract the lung field portion (region), and based on the lung field region obtained, determines the mediastinum and lung-mediastinum boundary regions.

Instead of the raw image signal, the reduced image signal, which has been subjected to the reduction operation by the image reducing circuit 313 as described above, is provided to the segmentation circuit 314, thereby reducing the time required for various arithmetic operations for segmentation processing to enable processing to be efficiently executed.

The result of segmentation in the segmentation circuit 314 is supplied to the dynamic-range compression circuit 315 via the CPU bus 307 under the control of the CPU 308.

In the dynamic-range compression circuit (DRU) 315, the warping line point determination circuit (WPU) 315a uses the results of the segmentation executed by the segmentation circuit 314 to determine the point ($x_2$, $y_2$) passed by the warping line.

A candidate for ($x_2$, $y_2$) is the centroid of the mediastinum or the average of lung-mediastinum boundary, which is set by the operation panel 311.

Thus, the CPU 308 uses the centroid of the mediastinum or the average of the lung-mediastinum boundary set on the operation panel 311 in order to control the point determination circuit 315a so as to determine the point ($x_2$, $y_2$) passed by the warping line.

The warping line slope determination circuit (WSU) 315b uses the point ($x_2$, $y_2$) passed by the warping line, which has been determined by the point determination circuit 315a, to determine the slope of the warping line.

Although the slope of the warping line may be determined by the slope determination circuit 315b, a value unique to the apparatus or the user's desired value may be set using the operation panel 311.

The warping angle determination (WAU) circuit 315c uses the slope of the warping line determined by the slope determination circuit 315b in order to determine warping angle $\phi$ based on dynamic-range compression rate "$\Delta d$" or "$\Delta p$".

The operation panel 311 sets whether the dynamic-range compression rate is "$\Delta d$" or "$\Delta p$".

Thus, the CPU 308 uses the dynamic-range compression rate "$\Delta d$" or "$\Delta p$" set on the operation panel 311 in order to control the warping angle determination circuit 315c so as to determine warping angle $\phi$.

Using the compression method described in, for example, "SPIE Medical Imaging 97 'Anatomic Region Based Dynamic Range Compression for Chest Radiographs Using Warping Transformation of Correlated Distribution'", the arithmetic circuit (WTU) 315d convert the pixel values based on the point ($x_2$, $y_2$) passing the warping line, which has been determined by the point determination circuit 315a, the slope of the warping line determined by the warping line slope determination circuit 315b, and the warping angle $\phi$ determined by the warping angle determination circuit 315c, thereby obtaining a dynamic-range compressed image signal.

At this point, the magnetic disc drive 310 transfers the raw image signal file stored in the magnetic disc (not shown) to the arithmetic circuit 315d via the CPU bus 307 under the control of the CPU 308.

Thus, the arithmetic circuit 315d converts the pixel values in the raw image signal transferred via the CPU bus 307 to obtain a dynamic-range compressed-image signal.

The image signal (the dynamic-range compressed-image signal), which has been subjected to the dynamic-range compression processing in the arithmetic circuit 315d, is transferred to each of the magnetic disc driver 310 and the image display device 312 via the CPU bus 307 under the control of the CPU 308.

The magnetic disc driver 310 files the dynamic-range compressed-image signal transferred via the CPU bus 307, in a magnetic disc (not shown) as an X-ray chest image information file after image processing.

At the same time, the image display device (DPU) 312 displays on a screen the X-ray chest image transferred via the CPU bus 307 based on the dynamic-range compressed-image signal.

As described above, the present embodiment automatically determines the parameter for dynamic-range compression (the point ($x_2$, $y_2$) passing the warping line) that fits the features of the target image by depending on the characteristic of the target image. For example, the centroid of the segmented mediastinum portion or the average of the lung-mediastinum boundary is determined as the point ($x_2$, $y_2$) passing the warping line. This enables dynamic-range compression optimal to the target image, thereby constantly providing an X-ray chest image in stable desired conditions.

In addition, the slope of the warping line can be varied to control the amount of dynamic-range compression and thus the contrast. This also serves to obtain an X-ray chest image in desired conditions.

Moreover, by determining the warping angle φ that resists the noise of the distribution, an X-ray chest image in better conditions can be obtained.

Although in the image processing circuit 300, the image reducing circuit 313 reduces the size of the X-ray image and supplies it to the segmentation circuit 314, the image reducing circuit 313 can be omitted to directly supply the segmentation circuit 314 with the image (raw image) pre-processed by the pre-processing circuit 306.

In addition, the present invention may be applied to a unitary apparatus or a system composed of multiple apparatuses, as shown in FIG. 8.

As described above, the present invention executes dynamic-range compression processing depending on the characteristic of the target image and in a manner optimal to the features of this image. This enables stable high-grade images to be obtained constantly and efficiently.

If, for example, the target image is an X-ray chest image, the mediastinum is a first site, and the lung field is a second site, the parameter for dynamic range compression (the point passing the warping line) is automatically determined depending on the characteristic of the target image and in a manner optimal to the features of this image. Specifically, the centroid of the segmented mediastinum portion or the average of the lung-mediastinum boundary is determined as the point $(x_2, y_2)$ passing the warping line. This enables dynamic-range compression optimal to the X-ray chest image thereby constantly providing an X-ray chest image in stable desired conditions. In addition, the slope of the warping line can be varied to control the amount of dynamic-range compression and thus the contrast. This also serves to obtain an X-ray chest image in desired conditions. Moreover, by determining the warping angle φ that resists the noise of the distribution, an X-ray chest image in better conditions can be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing method including a step of dynamic-range-compression processing of an image, wherein said dynamic-range compression processing step comprises:
    a segmentation step of extracting a first anatomical area and a second anatomical area from an input image by using an anatomical segmentation;
    a statistical-amount acquisition step of calculating a statistical amount of the first anatomical area, which is determined from a pixel value and a peripheral average pixel value;
    a conversion process condition acquisition step of calculating a conversion process condition for compressing a dynamic-range of the first anatomical area according to the statistical amount; and
    a conversion step of converting the input image which includes the first anatomical area and the second anatomical area by using the conversion process condition.

2. An image processing method including a step of dynamic-range-compression processing of an image, wherein said dynamic-range compression processing step comprises:
    a segmentation step of extracting a first anatomical area and a second anatomical area from an input image by using an anatomical segmentation;
    a statistical-amount calculation step of calculating a statistical amount which indicates a characteristic amount of a boundary portion between the first anatomical area and the second anatomical area;
    a conversion process condition acquisition step of calculating a conversion process condition according to the statistical amount; and
    a conversion step of converting the input image data by using the conversion process condition.

3. A method according to claim 2, wherein said statistical-amount calculation step includes a step of calculating a statistical amount which is determined from pixel values and a peripheral average pixel value.

4. A method according to claim 1, wherein said conversion step includes a step of defining a reference line on a two-dimensional plane in which the axes indicate said pixel values and said peripheral average pixel value, respectively, and a step of warping said pixel values based on the amounts proportional to distances between the reference line and the points corresponding to said pixel value of each pixel and said peripheral average pixel value.

5. A method according to claim 1, wherein said conversion step includes a step of defining, depending on said statistical amount, a reference line on a two-dimensional plane in which the axes indicate said pixel values and said peripheral average pixel value, respectively, and a step of warping said pixel values based on the amounts proportional to distances between the reference line and the points corresponding to said pixel value of each pixel and said peripheral average pixel value.

6. A method according to claim 5, wherein said conversion step includes a step of determining at least a point passed by said reference line or its slope depending on said statistical amount.

7. A method according to claim 5, wherein said conversion step includes a step of converting the pixel value of a first point on said two-dimensional plane into the pixel value of a second point corresponding to the intersection of said reference line and a straight line passing the first point and having a predetermined angle from said orthogonal axes.

8. A method according to claim 5, wherein said conversion step includes a step of converting the pixel value of a first point on said two-dimensional plane into the pixel value of a second point corresponding to the intersection of said reference line and a straight line passing the first point and having a predetermined angle from said orthogonal axes, and a step of determining said predetermined angle depending on said statistical amount.

9. A method according to claim 2, wherein said conversion step coverts said pixel values using the same dimensions as in said characteristic amount value.

10. A method according to claim 3, wherein said statistical-amount calculation step includes a step of calculating a statistical amount consisting of an average and a condition average.

11. An image processing apparatus for dynamic-range-compression processing of an image, comprising:
    a segmentation unit that extracts a first anatomical area and a second anatomical area from an input image by using an anatomical segmentation;
    a statistical-amount acquisition unit that calculates a statistical amount of the first anatomical area, which is determined from a pixel value and a peripheral average pixel value;

a conversion process condition acquisition unit which calculates a conversion process condition for compressing a dynamic-range of the first anatomical area according to the statistical amount; and a conversion unit which converts the input image which includes the first anatomical area and the second anatomical area by using the conversion process condition.

12. An image processing apparatus for dynamic-range-compression processing of an image, comprising:

a segmentation unit that extracts a first anatomical area and a second anatomical area from an input image by using an anatomical segmentation;

a statistical-amount calculation unit that calculates a statistical amount which indicates a characteristic amount of a boundary portion between the first anatomical area and the second anatomical area;

a conversion process condition acquisition unit which calculates a conversion process condition according to the statistical amount; and a conversion unit that converts the input image data by using the conversion process condition.

13. A method according to claim 1, wherein the input image is an image of a chest, the first anatomical area is a mediastinum portion, and the second anatomical area is a lung field.

14. A method according to claim 2, wherein the input image is an image of a chest, the first anatomical area is a mediastinum portion, and the second anatomical area is a lung field.

15. A method according to claim 1, wherein said conversion steps includes a step of performing a conversion processing under a conversion condition which is set with a passing point, slope and angle of a warping line.

* * * * *

UNITED STATES PATENT AND TRADEMARK OFFICE
CERTIFICATE OF CORRECTION

PATENT NO. : 6,608,915 B2
DATED : August 19, 2003
INVENTOR(S) : Tsujii

It is certified that error appears in the above-identified patent and that said Letters Patent is hereby corrected as shown below:

Column 12,
Line 21, "the" should be deleted;
Line 52, "said pixel values" should read -- the statistical amount --; and Column 14,
Line 14, "steps" should read -- step --.

Signed and Sealed this

Seventh Day of September, 2004

JON W. DUDAS
*Director of the United States Patent and Trademark Office*